(12) United States Patent
Smith

(10) Patent No.: US 9,924,527 B2
(45) Date of Patent: Mar. 20, 2018

(54) MULTIPLE PHYSICAL LAYER WI-FI RADIO SYSTEM

(71) Applicant: SR Technologies, Inc., Davie, FL (US)

(72) Inventor: Conrad C. Smith, Parkland, FL (US)

(73) Assignee: SR Technologies, Inc., Davie, FL (US)

( * ) Notice: Subject to any disclaimer, the term of this patent is extended or adjusted under 35 U.S.C. 154(b) by 141 days.

(21) Appl. No.: 15/153,860

(22) Filed: May 13, 2016

(65) Prior Publication Data

US 2016/0345378 A1   Nov. 24, 2016

Related U.S. Application Data

(60) Provisional application No. 62/164,835, filed on May 21, 2015.

(51) Int. Cl.
| | |
|---|---|
| *H04W 4/00* | (2009.01) |
| *H04W 72/08* | (2009.01) |
| *H04W 52/02* | (2009.01) |
| *H04W 84/06* | (2009.01) |

(52) U.S. Cl.
CPC ....... *H04W 72/085* (2013.01); *H04W 52/028* (2013.01); *H04W 52/0229* (2013.01); *H04W 84/06* (2013.01); *Y02B 60/50* (2013.01)

(58) Field of Classification Search
None
See application file for complete search history.

(56) References Cited

U.S. PATENT DOCUMENTS

| | | | | |
|---|---|---|---|---|
| 2004/0252641 A1* | 12/2004 | Bagchi | ............... | H04L 27/0012 370/230 |
| 2010/0079005 A1* | 4/2010 | Hyde | ............... | H02J 17/00 307/104 |
| 2010/0329389 A1* | 12/2010 | Ishihara | ............... | H04L 5/0023 375/316 |
| 2012/0155378 A1* | 6/2012 | Kim | ............... | H04B 7/18515 370/319 |
| 2013/0054995 A1* | 2/2013 | Dove | ............... | H04L 12/40032 713/323 |
| 2013/0244648 A1* | 9/2013 | Singh | ............... | H04L 5/0051 455/435.1 |
| 2013/0301631 A1* | 11/2013 | Hegde | ............... | H04W 16/14 370/345 |

(Continued)

*Primary Examiner* — Otis L Thompson, Jr.
(74) *Attorney, Agent, or Firm* — Christopher & Weisberg, PA

(57) ABSTRACT

A monitoring station and method for increasing a frequency of wireless packet reception. The monitoring station includes a physical layer (PHY) having a plurality of radio frequency (RF) receivers, processing circuitry comprising a processor, and a memory storing instructions that, when executed, configure the processor to control timing offsets of each of the plurality of RF receivers such that each of the plurality of RF receivers has a different timing offset with respect to each other. The monitoring station includes an RF signal router configured to receive an incoming RF signal and route the RF signal to the plurality of RF receivers, and vary at least one of signal gain and signal loss for the incoming RF signal across each of the plurality of RF receivers such that each of the plurality of RF receivers has a different effective noise figure with respect to each other.

20 Claims, 9 Drawing Sheets

(56) References Cited

U.S. PATENT DOCUMENTS

| | | | | |
|---|---|---|---|---|
| 2014/0133290 A1* | 5/2014 | Yokoo | .................. | H04W 36/30 |
| | | | | 370/216 |
| 2015/0023365 A1* | 1/2015 | House | .................. | H04J 3/0605 |
| | | | | 370/410 |
| 2015/0117367 A1* | 4/2015 | Manapragada | ....... | H04W 72/02 |
| | | | | 370/329 |
| 2015/0349870 A1* | 12/2015 | Chen | .................... | H04B 7/0822 |
| | | | | 375/347 |
| 2016/0054819 A1* | 2/2016 | Avanzi | ................ | G06F 3/03545 |
| | | | | 345/179 |
| 2017/0063166 A1* | 3/2017 | Shimokawa | ............ | H02J 17/00 |

* cited by examiner

MULTIPLE PHYSICAL LAYER WI-FI RADIO SYSTEM

CROSS-REFERENCE TO RELATED APPLICATION

This application is related to and claims priority to U.S. Provisional Patent Application Ser. No. 62/164,835, filed May 21, 2015, entitled MULTIPLE PHY Wi-Fi RADIO SYSTEM, the entirety of which is incorporated herein by reference.

STATEMENT REGARDING FEDERALLY SPONSORED RESEARCH OR DEVELOPMENT n/a

TECHNICAL FIELD

The present disclosure relates to wireless communications and in particular to a method and monitoring station for increasing the frequency of wireless packet reception and improving extended range communications by utilizing multiple independent receivers in the physical layer (PHY).

BACKGROUND

Of particular interest for this disclosure is the communication between devices that are based upon the Institute of Electrical and Electronics Engineers (IEEE) 802.11 technology, commonly known as Wi-Fi. IEEE Standard 802.11-2012 may be used as the basis for the specifications used in this disclosure.

The following is a review of the protocol layers that are present in a typical Wi-Fi device so that descriptions of the proposed disclosure can be readily understood. FIG. 1 is a block schematic diagram that represents two communicating Wi-Fi devices 110 and 120. Wireless device 110 includes a logical link control (LLC) layer 111, a media access control (MAC) layer 112 and a physical layer (PHY) 113. Similarly, wireless device 120 includes a logical link control (LLC) layer 121, a media access control (MAC) layer 122 and a physical layer (PHY) 123. The LLC layers 111 and 121 allow further protocol multiplexing over an Ethernet connection. Consider the transmission of data from device 110 to device 120. In wireless device 110, the MAC layer 112 accepts data, in the form of MAC service data units (MSDU) 114 from the LLC layer 111. The MAC layer 112 is the function that arbitrates the use of the network capacity and determines which stations are allowed to use the medium for transmission. The MAC layer 112 sends the MSDU data 114 in the form of a physical layer convergence procedure (PLCP) service data unit (PSDU) 115 to the physical layer (PHY) 113. The PHY 113 is responsible for transmitting the PSDU data 115 to the other device 120 in the form of a PLCP protocol data unit (PPDU) 131.

The PHY will typically comprise radio frequency (RF) transmitters and RF receivers. The actual numbers of transmitters and receivers are not limited to what is shown in FIG. 1 or described in this disclosure and may depend upon the different PHYs that are described in the IEEE 802.11 specification. The PPDU 131 includes the PLCP headers, MAC headers, the MAC data field and the MAC and PLCP trailers. The MAC protocol data unit (MPDU) 130 is the frame PPDU 131 without the PLCP headers. Therefore, the MPDU 130 can be considered as the data unit that is exchanged between the MAC layers 112 and 122 where the PPDU 131 is what is exchanged over the wireless medium. The PPDU 131 is received at the PHY 123 in device 120 which then sends the resulting PSDU 125 up to the MAC layer 122. The MAC layer 122 in turn sends the resulting MSDU 124 up to the LLC layer 121.

FIG. 2 is a diagrammatic representation depicting an embodiment of a monitoring wireless station (STA) 210 that is located in an airborne platform 200. Connected to the monitoring STA is an antenna 220. The antenna 220 may be a directional antenna. The area 230 represents the area on the ground that the antenna 220 is effectively covering in that signals within the area 230 have the potential of being received by the monitoring STA 210 through its accompanying antenna 220. Area 230 may include a number of Wi-Fi networks 240. The networks 240 may be infrastructure Wi-Fi networks each having one or more APs and several STAs. The networks will in practice be communicating on a selection of channel frequencies, and several networks may be using the same channel frequency. It should be noted that due to the propagation losses between the networks 240 on the ground, networks using the same frequency do not necessarily overlap and hence will be transmitting packets simultaneously. At the airborne monitoring STA 210, however, due to the predominantly line of sight propagation, that same simultaneous network traffic on the same frequency channel is more likely to be received, i.e., reception of non-overlapping network traffic will be effectively overlapping at the monitoring STA 210.

The following is a discussion of the standard reception method for monitoring wireless packets in a typical Wi-Fi device. FIG. 3 is a timing diagram showing a number of transmitted packets from a number of networks as received by a legacy monitoring receiver. In this example, at time T1 360 packet 341 that was transmitted by network D 340 is received by the monitoring STA. At time T3 362 packet 341 is complete. In order to receive a new packet, the start of the packet must be detected, hence the next packet that may be received is packet 332 from network C 330 at time T5 364. At time T6 365 packet 311 from network A 310 is detected by the monitoring STA. In this example, packet 311 from network A 310 is received at a higher signal strength than packet 332 and in this case, the monitoring receiver may abandon the reception of packet 332 and start receiving packet 311. This is known as step-up where a receiver may abandon the reception of a packet if the start of a new packet is detected at a significantly higher signal strength.

At time T7 366, packet 311 is complete and the next packet that the monitoring receiver may receive is then packet 342 from network D 340 at time T9 368. It should be noted that for the monitoring receiver to detect and start to receive a new packet, it is generally necessary for there to be a clear period, the exception being if a new packet is detected at a significantly higher signal strength such that step-up can take place. In the example as depicted in FIG. 3, after the monitoring STA has completed receiving packet 341 it must wait until packet 321 from network B 320 and packet 351 from network E 350 have completed. There is then a free period between times T4 363 and T5 364 which is when packet 332 starts. Similarly after the reception of packet 311, the monitoring STA must wait until packet 352 from network E 350 has completed and there is a free period between T8 367 and T9 368 which is the time that reception of packet 342 commences. The example as depicted in FIG. 3 demonstrates that in the case of a single airborne monitoring receiver, when a number of signals on the same frequency channel are received from a number of ground based networks, the receiver can only detect and receive a relatively small proportion of the packets.

FIG. 4 shows two examples of the general format of IEEE 802.11 wireless packets. In FIG. 4, packet 400 is a sample packet used by a Wi-Fi transmitter in the 2.4 GHz band complying with Clauses 16 Direct Sequence Spread Spectrum (DSSS) device and Clause 17 High Rate DSSS (HR/DSSS) device in the IEEE 802.11 standard. Such devices are commonly known as 11b devices. The packet 400 starts with a preamble 401 which is followed by a header 402. The MAC header 403, the frame body 404 and the final frame check sum (FCS) are transmitted at the data rate which, in the case of an 11b device may be, for example, 1 megabit per second (Mbps), 2 Mbps, 5.5 Mbps or 11 Mbps. The preamble 401 is always transmitted at 1 Mbps. In the case that the data rate is 1 Mbps, the header 402 is also transmitted at 1 Mbps. In the cases that the data rate is 2 Mbps, 5.5 Mbps, or 11 Mbps, the header 402 may be transmitted at 1 Mbps or 2 Mbps.

In the 2.4 GHz band, it is also possible to use the orthogonal frequency division modulation (OFDM) of Clause 19 Extended Rate PHY (ERP), commonly referred to as 11g. In FIG. 4, packet 450 is in a format used by a Wi-Fi transmitter in the 2.4 GHz band complying with Clause 19 in the IEEE 802.11 standard using OFDM. The preamble 451 and the signal 452 are transmitted at the lowest OFDM rate, i.e., 6 Mbps. The service field 453, MAC header 454, frame body 455 and FCS 456 are transmitted at the required data rate.

The start of a Wi-Fi packet is at the lowest PHY rate, 1 Mbps in the case of an 11b device. The signal to noise and interference ratio (SNIR) requirement in order to detect the 1 Mbps preamble is very low, and hence the detection of the preamble and header by a receiver is very sensitive. Similarly, the detection and demodulation of a complete packet sent at 1 Mbps can be achieved in low SNR conditions. In theory, the SNIR requirement for 1 Mbps is in the order of 0 dB which means that even if the noise and interference power is at a similar power to the packet signal level, the receiver may still correctly detect the packet. Thus, it is possible to detect the start of a packet even if another packet is present as long as the SNIR is above 0 dB.

Wireless packets that are of interest to a monitoring STA include management packets as well as control packets and data packets. Of particular interest are beacons that each wireless device, i.e., AP transmits on a regular basis. Beacons in the 2.4 GHz band are generally transmitted at 1 Mbps PHY rate. Other management frames, such as probe requests and responses, authentication packets and association packets are often also sent at 1 Mbps PHY rate. It is possible to detect the start of many management packets even if another packet is present as long as the SNIR for the management packet is above 0 dB. When wireless packets are monitored, referring to FIG. 4, the preamble 401 and header 402, or the preamble 451 and signal 452 will be transmitted at a low PHY rate as previous described above with respect to FIG. 4. The MAC header field 403 or 454 is of particular interest because the address fields are contained within. The MAC header field, however, is transmitted at the desired PHY rate. For example, for an 11 Mbps data packet, the preamble 401 is sent at 1 Mbps, the header 402 is sent at 2 Mbps and the MAC header 403, frame body 404 and FCS 405 all sent at 11 Mbps. The preamble 401 and header require about 0 dB SNIR for detection, while the rest of the packet transmitted at 11 Mbps requires about 5 dB SNIR.

Consider again FIG. 3. The progressive reception of packets 341, 332, 311 and 342 is due to the monitoring STA obeying a rule that it can only detect the start of a new packet if the medium is free for a finite amount of time before the packet is received. The practical situation, however, is that if the SNIR is sufficient, then a packet may be detected and received even if another packet is active and present at the same time. Hence, at time T7 366, the monitoring STA may, at the conclusion of the receipt of packet 311, then detect the start of packet 352, even though packet 332 is also being received. In this case, at time T9 368 the monitoring STA will then detect packet 342. Hence, as shown in this example, dependent upon the relative signal strengths of packets present at the receiver, and on the timing of those said packets, the number of packets detected and received will vary.

A monitoring STA, when used to monitor transmissions, is placed into what is termed promiscuous mode. In promiscuous mode a STA acts solely as a receiver and also attempts to receive the complete packet. In a standard communications mode, a STA will detect if the packet was addressed to itself and only if confirmed will the complete packet be demodulated. In the monitoring promiscuous mode, the STA will attempt to demodulate all detected packets.

When a monitoring wireless device, or monitoring STA is located in an aircraft and is used to either monitor transmissions between devices on the ground, or to communicate with one or more ground based devices, a problem exists in picking out any specific communication or packet of interest due to the number of packets that are present at any one time. Because the STA is airborne, with one or more antennas that are directed towards the ground, it is a common condition that the area of coverage on the ground is relatively large and as such the traffic in many networks can be detected simultaneously. In this situation, a single receiver cannot be assured that it will receive the specific communication it is looking for.

SUMMARY

The present invention advantageously provides a method, monitoring station and system for increasing the frequency of data packet reception.

In one aspect of the disclosure, a monitoring station for increasing the frequency of data packet reception is provided. The monitoring station includes a physical layer (PHY) comprising a plurality of radio frequency (RF) receivers, processing circuitry including a processor, and a memory. The memory is configured to store instructions that, when executed, configure the processor to control timing offsets of each of the plurality of RF receivers such that each of the plurality of RF receivers has a different timing offset with respect to each other. The monitoring station also includes an interface, the interface including an RF signal router configured to receive an incoming RF signal and route the RF signal to the plurality of RF receivers, and vary at least one of signal gain and signal loss for the incoming RF signal across each of the plurality of RF receivers such that each of the plurality of RF receivers has a different effective noise figure with respect to each other.

In another aspect of the disclosure, a method for increasing a frequency of data packet reception is provided. The method includes controlling timing offsets of each of the plurality of RF receivers such that each of the plurality of RF receivers has a different timing offset with respect to each other, receiving an incoming RF signal and routing the RF signal to the plurality of RF receivers, and varying at least one of signal gain and signal loss for the incoming RF signal across each of the plurality of RF receivers such that each of the plurality of RF receivers has a different effective noise figure with respect to each other.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

This disclosure relates to communication over extended ranges. The following descriptions are provided using devices that are based upon the IEEE 802.11 technology, commonly known as Wi-Fi. More particularly, this disclosure relates to extended range communications from a monitoring device with a legacy target device, and also to monitoring a number of ground based Wi-Fi devices, which could be both access points (AP) and stations (STA), or a combination of both. The legacy target devices may comply with the 802.11 Standard, generally known as Wi-Fi. The monitoring device is one that generally complies with the 802.11 Standard but has been modified, according to the embodiments described in this disclosure, to enable extended range communications and monitoring with target devices.

A monitoring device is disclosed that includes a physical layer (PHY) that has a multitude of PHY blocks that are connected with a common media access data link layer. An embodiment of the present disclosure that employs multiple receivers at the monitoring STA increases the possibility that more packets from the ground networks are received even if the receivers are all sharing the same receiving antenna. The variations in noise and time will cause the receptions of packets at the various receivers to become offset and this results in an increase in the number of packets that are received from the ground networks. It has been determined that increasing the number of receivers employed in the monitoring STA increases the number of packets received from the ground networks. Throughout this disclosure, the term "packets" or "wireless packets" shall refer to different types of packets including management packets, control packets and data packets.

Another embodiment of the disclosure is that of a monitoring STA that is used for extended range communication with a target ground based device. The variations in noise and time will cause the receptions of packets at the various receivers to become offset and hence the possibility of reception of the wanted packets, be they management frames, control frames, and/or data frames is increased.

Although the description details provided herein are based upon devices that generally comply to the 802.11 Standard, generally known as Wi-Fi, this is for example purposes and the disclosure, concepts and processes described herein can be used for other protocol and communication formats.

Figure 5:
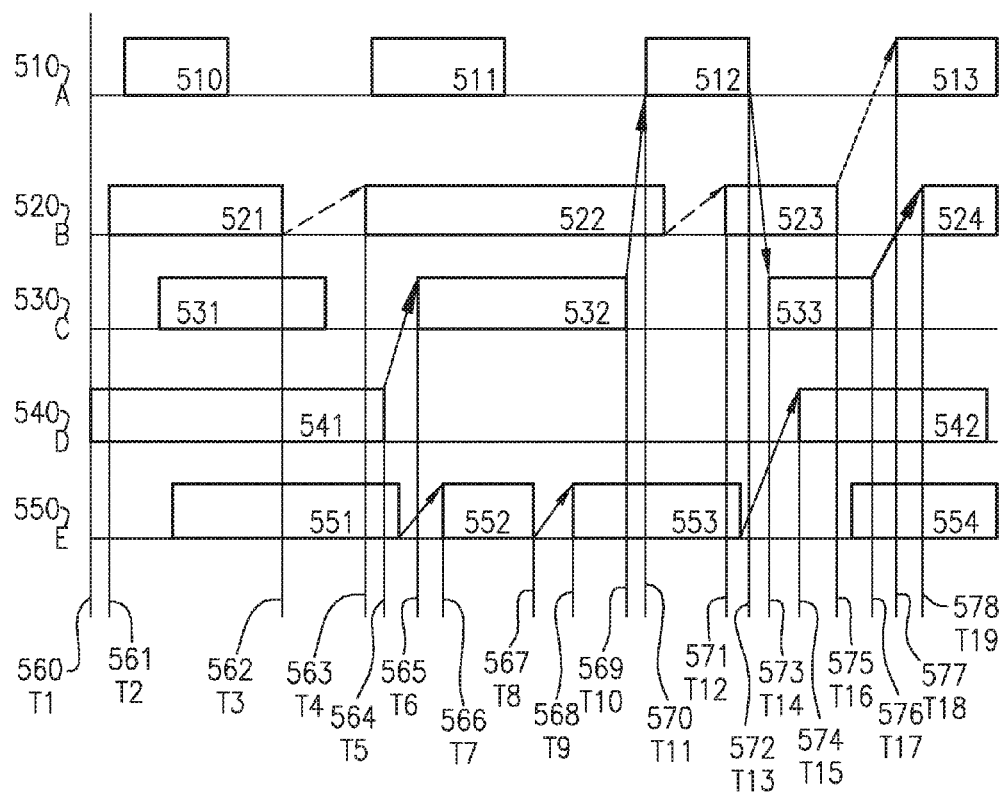
FIG. 5 is a diagram depicting multiple packets received at a monitoring STA receiver according to an embodiment of the present disclosure.

FIG. 5 is a diagram showing many packets present at a monitoring STA receiver according to an embodiment of the present disclosure. Assume that a monitoring receiver X receives packet 541 at time T1 560 from ground based network D 540. At the end of the reception of packet 541 at time T5 564, the monitoring receiver X next detects and receives packet 532 from network C 530. In this example, it is assumed that the interference from the other packets 511 and 522 that are present at time T6 565, is such that the SNIR for packet 532 is sufficient for the monitoring receiver X to detect the packet 532. At time T10 569, at the end of packet 532, the monitoring receiver X will start looking for the start of a new packet and in this example it detects packet 512 from network A 510 at time T11 570. Again it is assumed that interference from other packets, in this case 522 and 553 is such that the resultant SNIR for packet 512 is sufficient for the monitoring receiver X to detect the packet 512. Following the same assumptions, at time T14 573 monitoring receiver X detects packet 533 from network C 530 and after that packet 524 from network B 520. Hence, in summary, monitoring receiver X receives, in turn, packets 541, 532, 512, 533 and 524.

Now consider a second monitoring receiver Y and assume that monitoring receiver Y is receiving packet 521 from network B 520 at time T2 561. At time T3 562 packet 521 ends and monitoring receiver Y next detects packet 522 also from network B 520 at time T4 563. As before, it is assumed that the interference from other packets, in this case packets 541 and 551 is not sufficient to degrade the SNIR to a level such that packet 522 is not detected. After packet 522 ends monitoring receiver Y will next detect packet 523 also from network B 520 at time T12 571 and at the end of packet 523 monitoring receiver Y then detects packet 513 from network A 510 at T18 577. Hence, in this example, monitoring receiver Y receives, in turn, packets 521, 522, 523 and 513.

Now further consider a third monitoring receiver Z and assume that monitoring receiver Z has detected and is receiving packet 551 from network E 550. Following the same assumptions as used for monitoring receivers X and Y, at the end of each received packet the receiver will detect the start of the next packet in time. Hence after packet 551 has ended, monitoring receiver Z will detect packet 552 at time T7 566. Similarly at time T9 568, monitoring receiver Z will detect packet 553 and at time T15 574 monitoring receiver Z will detect packet 542. Hence, monitoring receiver Z will detect in turn packets 551, 552, 553 and 542.

FIG. 5 demonstrates an example where, according to embodiments of the present disclosure, if three receivers are active, and the receivers are offset in time such that they start by receiving different packets, then there is a reasonable possibility that, in the case where there are many packets present, each monitoring receiver will continue to receive different packets as compared with the other monitoring receivers.

Figure 6:
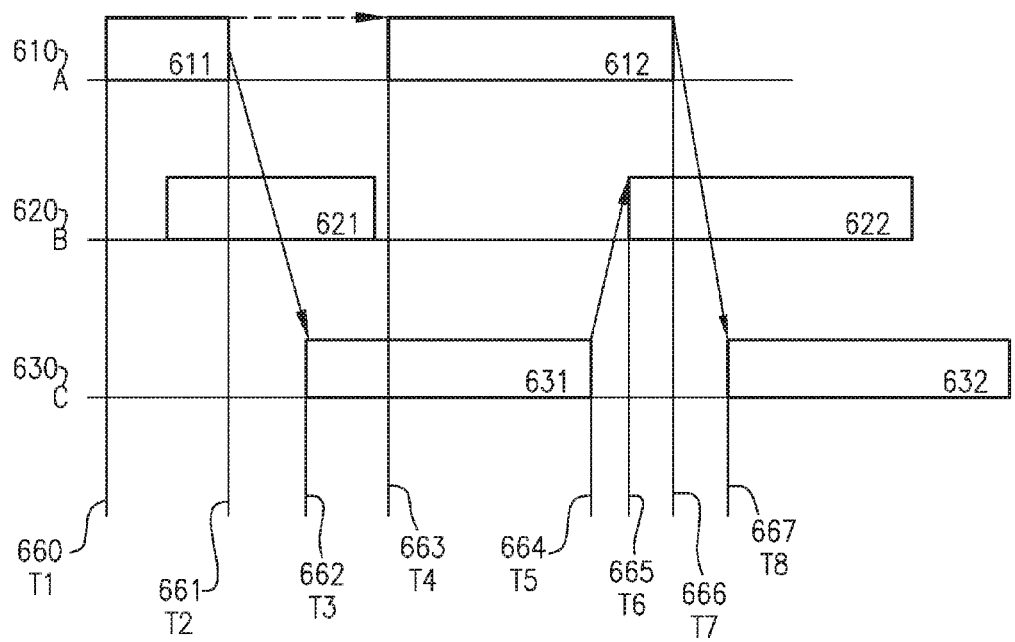
FIG. 6 is a diagram depicting a scenario where monitoring STA receivers may become offset in packet reception according to an embodiment of the present disclosure.

FIG. 6 is a diagram depicting the case where monitoring receivers may become offset in packet reception. In the example illustrated in FIG. 6, both monitoring receivers X and Y, at time T1 660, are receiving the same packet, packet 611 from ground network A 610. At time T2 661 packet 611 ends and both receivers X and Y start looking for the start of a new packet. At time T3 662, packet 631 from network C 630 is received at the monitoring STA. Packet 621 from network B 620 is also active at time T3 662 so whether the monitoring receiver X or Y detects packet 631 will depend upon the effective SNIR of packet 631 at each receiver X and Y. Assume in this case, that the noise figure for receiver X is better than that of receiver Y such that the SNIR of packet 631 is sufficient for receiver X to detect the packet 631, but that the SNIR of packet 631 is not sufficient for receiver Y to receive the packet 631 due to the extra noise figure of receiver Y. In this case, at time T3 662, monitoring receiver X will detect packet 631 but monitoring receiver Y will not detect packet 631.

Hence, at time T4 663, monitoring receiver Y detects packet 612 from network A 610. At time T5 664, packet 631 ends and at time T6 665, monitoring receiver X detects packet 622 from network B 620. At time T7 666 packet 612 ends and at time T8 667 monitoring receiver Y detects and starts to receive packet 632. In this case, the interference from packet 622 is not sufficient to prevent receiver Y from detecting packet 632. The signal strengths of individual packets are continuously varying due to propagation variations and also due to relative movement between the platform of the monitoring STA and the ground targets. Hence, even though the two receivers X and Y start off receiving the same packet, 611, they can become offset. In addition, if the receivers are caused to become active at varying times, then the possibility of detecting different packets is increased.

Hence, as described in FIG. 5 and FIG. 6, employing multiple receivers at the monitoring STA increases the possibility that more packets from the ground networks are received even if the receivers are all sharing the same receiving antenna. The variations in noise and time will cause the receptions of packets at the various receivers to become offset. It has been determined that increasing the number of receivers employed in the monitoring STA increases the number of packets received from the ground networks.

Figure 2:
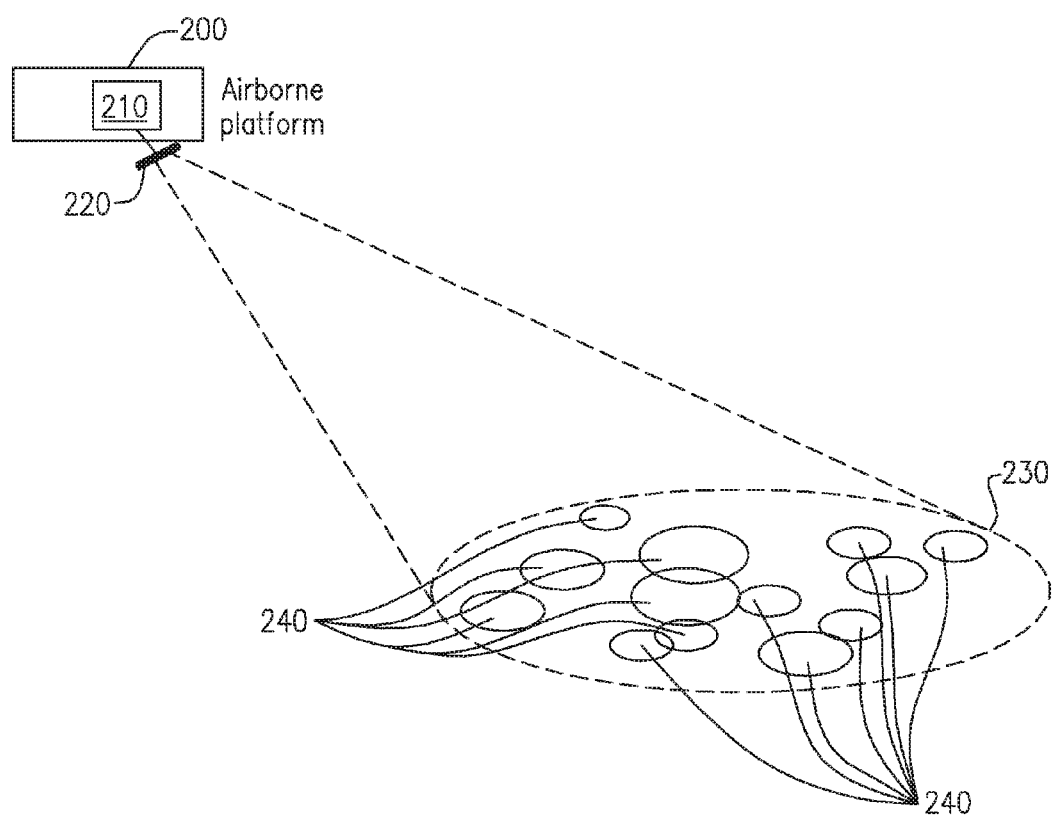
FIG. 2 is a diagrammatic representation depicting the scenario of a monitoring wireless station (STA) that is located in an airborne platform.
Figure 3:
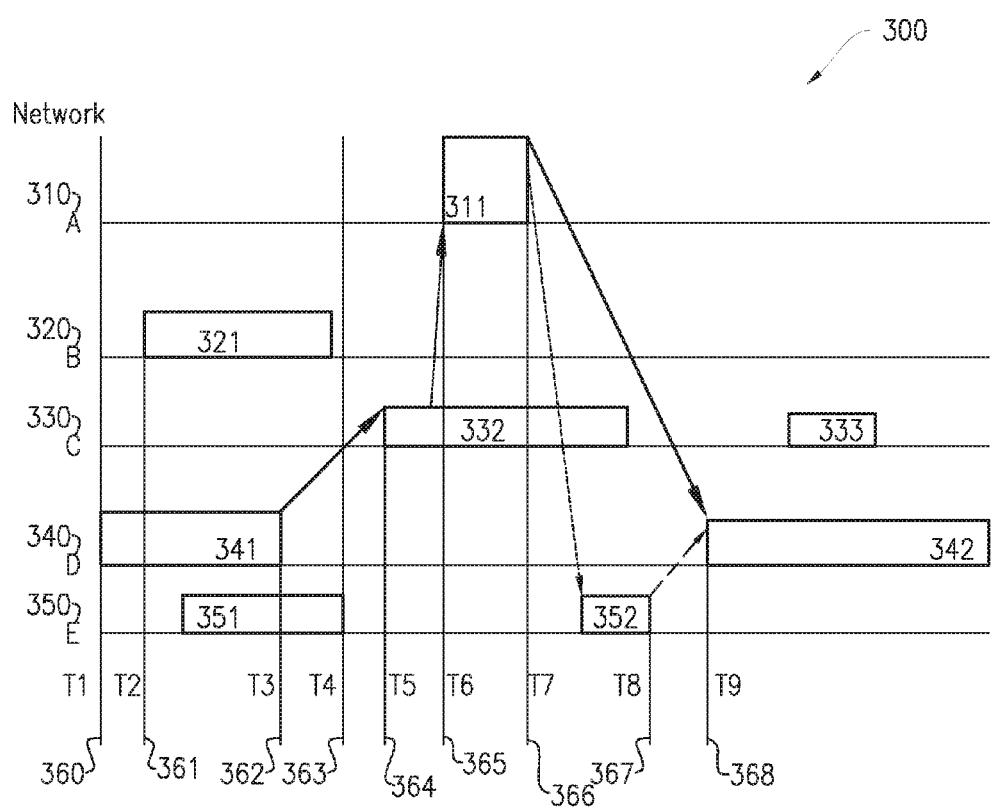
FIG. 3 is a diagrammatic representation depicting a number of packets transmitted from a number of networks and received by a legacy monitoring receiver.
Figure 4:
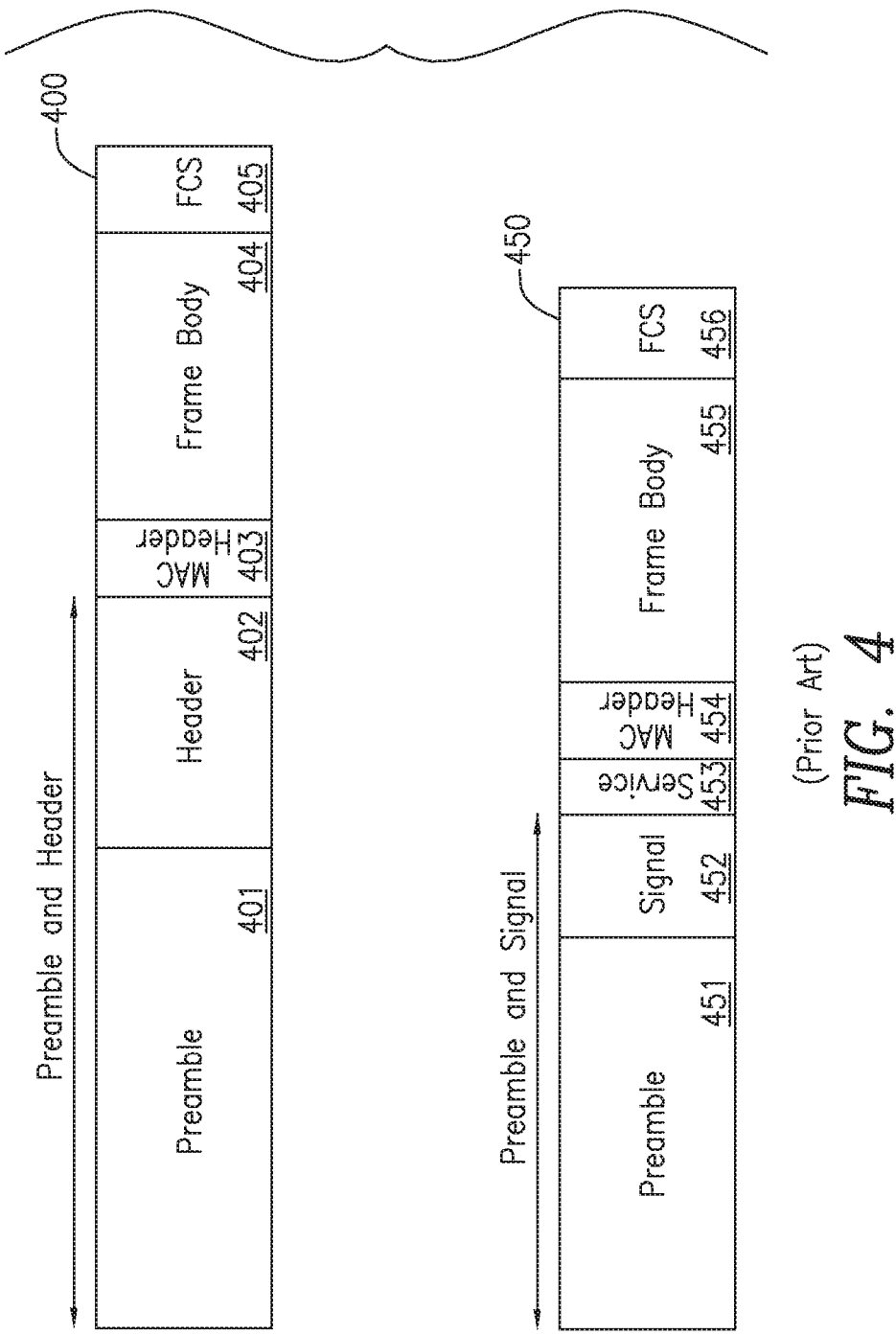
FIG. 4 depicts the general format of a 802.11 packet.

Another function of a monitoring STA is that of extended range communication with a target ground based device. In this case, it is desirable to detect the wanted packets sent by the target ground based AP or STA from among the many other packets that may be transmitted from the many ground networks, such as the arrangement shown in FIG. 2. The situation as to the reception of the wanted packets, be they management frames, control frames, or data frames is similar to the situation as previously described in FIG. 5 and FIG. 6 in that the possibility of detecting the wanted packet is increased if more than one receiver is used. In the case of extended communication with a ground based Wi-Fi device, it is possible to attempt to stop other ground based networks from transmitting by sending control frames or data frames with extended duration fields. But even in this case, it is not assured that the other networks will cease transmissions for long enough to allow the wanted packets to be received in the clear.

In one embodiment of the present disclosure, a monitoring device is disclosed that includes a PHY that has a number of PHY blocks that are connected with a common media access data link layer.

Figure 1:
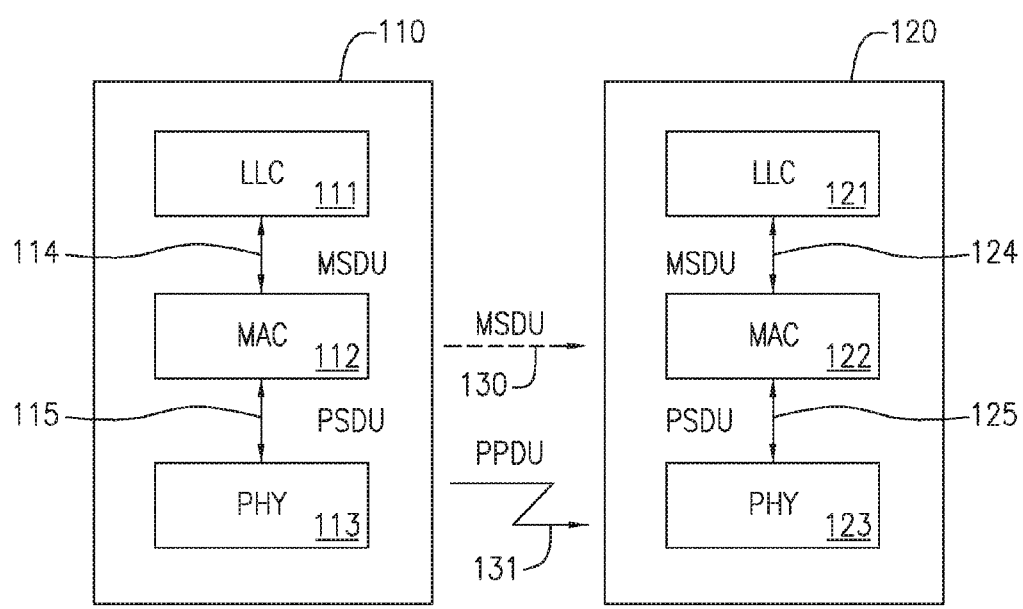
FIG. 1 is a block schematic diagram depicting a typical communication network including two communicating Wi-Fi devices.
Figure 7:
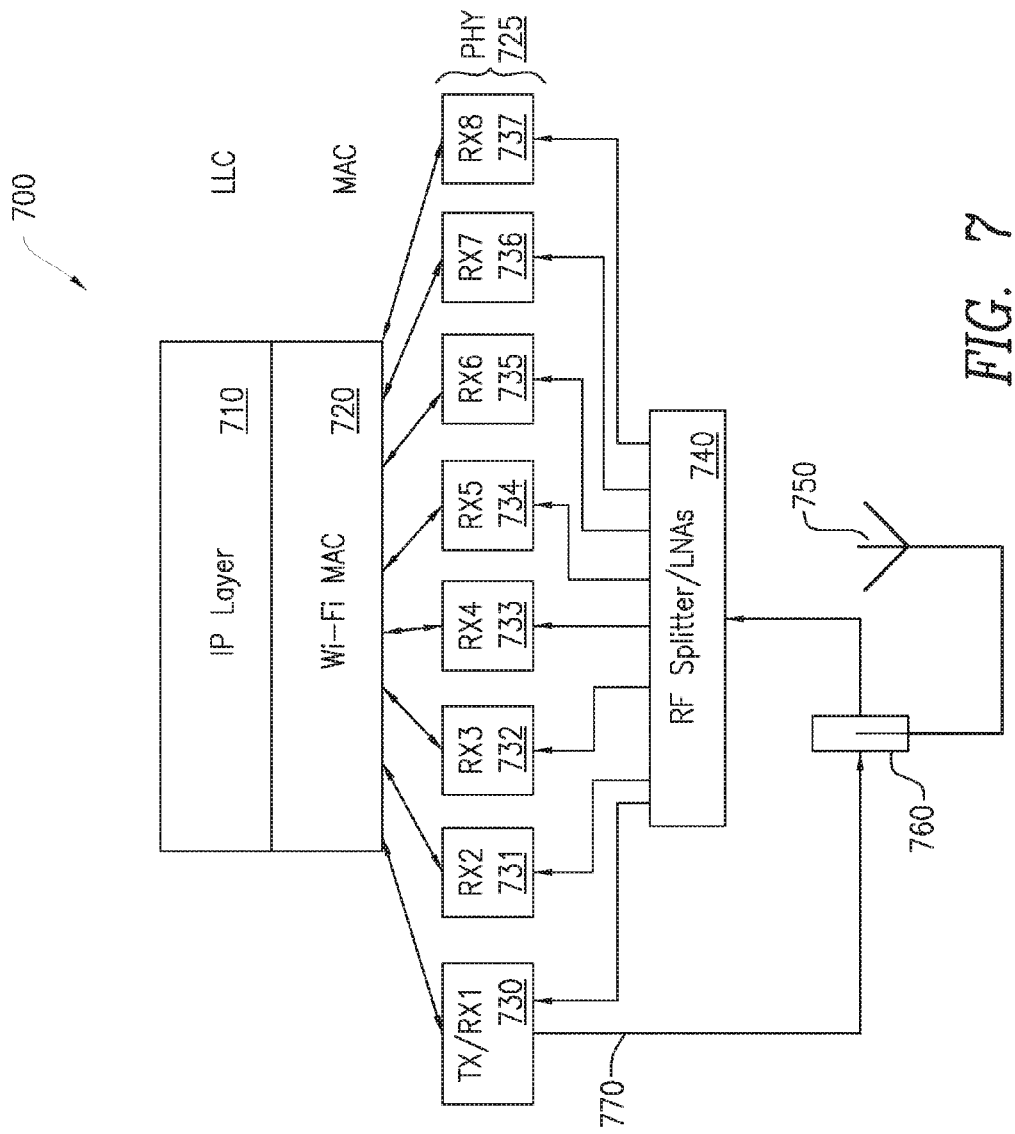
FIG. 7 is a block diagram of a monitoring STA according to an embodiment of the present disclosure.

FIG. 7 is a block diagram of a monitoring STA 700 according to an embodiment of this disclosure. PHY 725 comprises multiple receivers. In the embodiment illustrated in FIG. 7, seven receivers, 731, 732, 733, 734, 735, 736 and 737, and one transmitter/receiver 730 are shown. The arrangement shown in FIG. 7 is exemplary only, and the PHY may include any combination of transmitters, transmitter/receivers and receivers. Each of the eight PHY blocks 730 to 737 is in communication with the common MAC layer block 720. A single antenna 750 is in communication with an RF switch 760 which is used to connect the antenna 750 to either the transmitter/receiver 730, or to the input of an RF splitter/low noise amplifier (LNA) block 740. Block 740 includes RF circuitry that splits the incoming signal from the antenna 750, via the RF switch 760 into seven outputs, each of which is in communication with one of the seven receivers 731 to 737. One or more LNAs are used, in combination with one or more RF splitters such that the splitter loss is compensated for. As previously described in FIG. 1, the MAC layer 720 and the LLC or IP Layer 710 are interconnected. This embodiment of the disclosure represents a monitoring STA 700 that has a single transmitter port 770 which may be used to transmit packets to a specific target device such as, for example, an AP or STA, or to send data, management or control packets to broadcast or specific addresses. Wireless packets received at the antenna 750 may either be received by the single transmitter/receiver 730, or at every receiver block 731 to 737 via RF switch 760.

As discussed above and illustrated in FIG. 5 and FIG. 6, the use of multiple receivers increases the possibility of detecting more packets from the many packets that are present at the antenna 750. As also previously described, variations in timing offsets and noise figure across the receivers may further improve the likelihood of receiving a larger number of data packets. A further embodiment of this disclosure is that the RF splitter/LNA block 740 is arranged to vary the gains or losses across the receivers 731 to 737 such that the effective noise figure for each receiver is different. This method enhances the possibility that each receiver may detect different packets as previously described in FIG. 6.

Another embodiment of this disclosure is that the receivers 731 to 737 may be offset in time. This may be accomplished by, for example, powering up each receiver sequentially rather than simultaneously and/or periodically setting each receiver block into sleep mode for a period of time. In these embodiments, the receivers 731 to 737 may be effectively offset in time.

Figure 8:
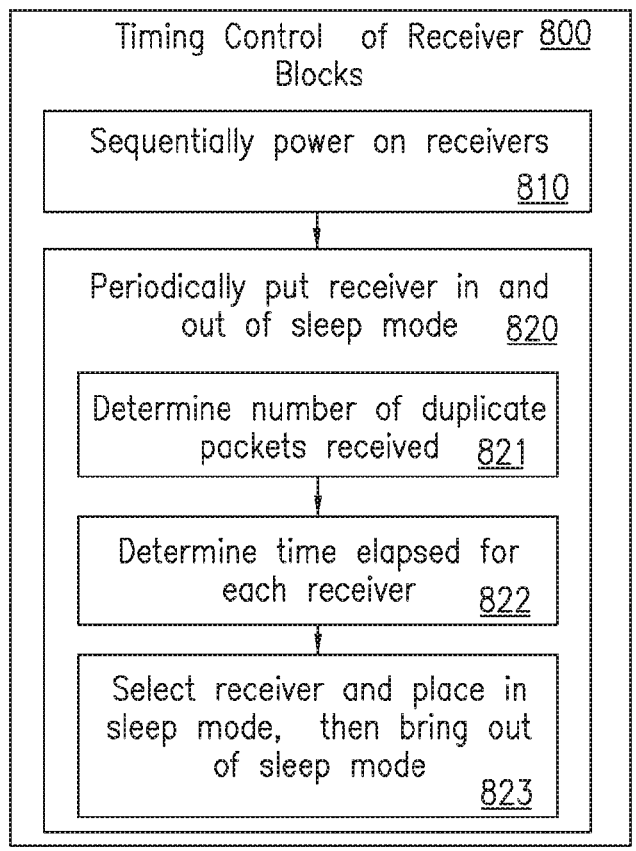
FIG. 8 depicts an exemplary method according to an embodiment of the disclosure for controlling the timing offsets of the receivers.

FIG. 8 illustrates a method 800 according to an embodiment of the disclosure for controlling the timing offsets of the receivers 731 to 737 in FIG. 7. Method 800 may include block 810 where the powering up of each receiver is controlled. The receivers may be powered up in a sequential manner such that the possibility of each receiver detecting a different packet, as described in FIG. 5, is increased. Method 800 may also include block 820 where, each receiver may be put into sleep mode and then awakened again such that the possibility of each receiver detecting a different packet, as described in FIG. 5, is increased. Block 820 may include block 821 where the number of duplicate packets is determined and this information is used to decide if the timing offset should be improved. Block 820 may include block 822 where the time that has elapsed from the last time a receiver was placed in and out of sleep mode is determined and that information used to decide if the receiver effective timing should be reset. Block 820 may include block 823 where a particular receiver is selected and placed into sleep mode and then brought out of sleep mode so that the effective receive timing is reset. The decision to place a particular receiver in and out of sleep mode may be influenced by the determinations made in blocks 821 and/or 822. The example of resetting a receiver timing by setting it in and out of sleep mode, i.e., sleeping and awakening is just one possible way of producing the desired timing offset as previously described. Other possible methods may be used. For example, the receivers may be reset by cycling the power to the device. Another method may be to periodically set the receive threshold to a particular level such that no signal is received for a period and then reset the receive threshold.

A further embodiment of this disclosure is that the RF splitter/LNA block 740 in FIG. 7 is arranged to vary the input gains or losses across the receivers 731 to 737 such that the effective noise figure for each receiver is different. This method increases the possibility that each receiver may detect different packets as previously described with respect to FIG. 6. A further method may be to set the receive threshold levels of each receiver 731 to 737 in FIG. 7 to different values.

Figure 9:
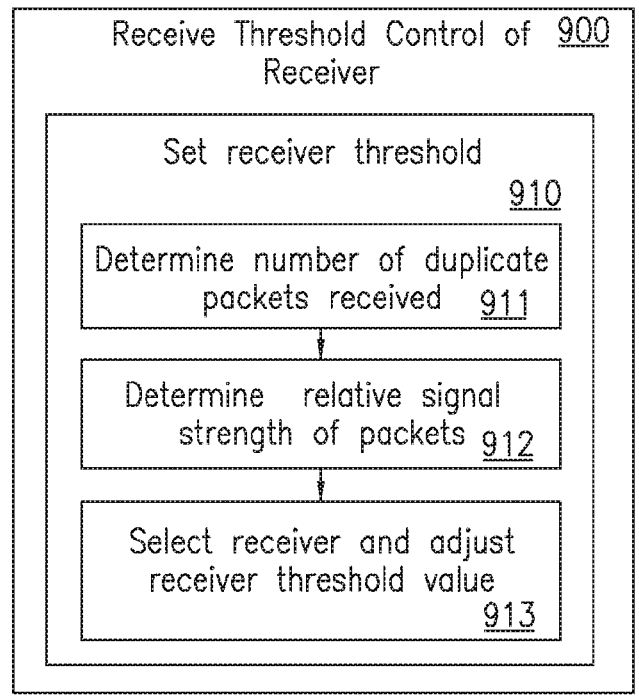
FIG. 9 depicts a method according to an embodiment of the disclosure for controlling the receiver sensitivity of the receivers.

FIG. 9 illustrates a method 900 according to an embodiment of the disclosure for controlling the receiver sensitivity of the receivers 731 to 737 in FIG. 7. Method 900 may include block 910 which sets the receiver sensitivity for each receiver. Block 910 may include block 911 where the number of duplicate packets that are being received is determined. Block 910 may include block 912 where the relative signal strengths of the received packets is determined. In the case that the monitoring STA is being used for communication, the actual or expected signal strength of the wanted signals may be determined. In the case that the monitoring STA is being used for monitoring, the range in signal strengths may be determined. Block 910 may include block 913 which selects a particular receiver and sets the receiver sensitivity or receiver threshold for that particular receiver. The decision to set a particular value of sensitivity threshold for each receiver may be influenced by the determination of the number of duplicate packets being received in block 911 and also by the determination of the signal strengths of the packets in block 913.

Figure 10:
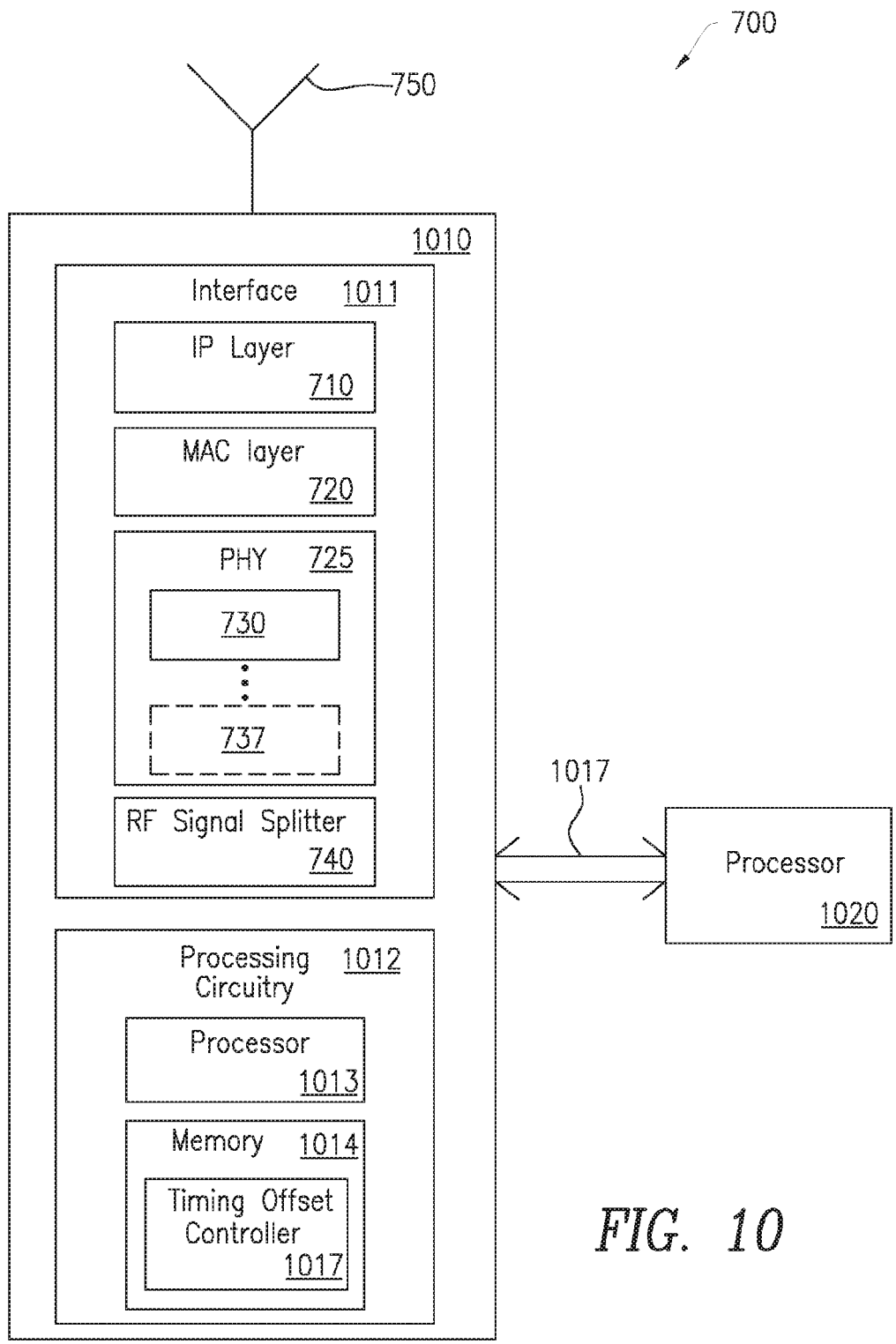
FIG. 10 depicts a wireless communication device which, according to an embodiment of the disclosure, may be used as the monitoring STA.

FIG. 10 illustrates a wireless communication device 700 which according to an embodiment of the disclosure may be used as the monitoring STA as detailed in FIG. 7.

The wireless communication device 700 may be one or more wireless devices that are based upon the IEEE 802.11 specification. The wireless communication device 700 may include a wireless monitoring station 1010. The wireless monitoring station 1010 may also be in communication with a processor 1020 which is interconnected to the station 1010 by a data bus 1017.

Monitoring station 1010 includes an interface 1011 and processing circuitry 1012. Processing circuitry 1012 includes a processor 1013 and a memory 1014. Monitoring station 1010 also includes one or more wireless antennas such as wireless antenna 750. The interface 1011 may also include one or more analog and/or digital front end devices plus the basebands, IP layer 710, the MAC elements of a Wi-Fi radio including MAC layer 720, and PHY 725. PHY 725 may include multiple PHY blocks, such as RF transmitters and/or RF receivers 730-737, as detailed in FIG. 7. The interface 1011 and/or the processor 1013 may include elements for measuring and/or calculating attributes of received signals (input signals). The interface 1011 and/or the processor 1013 may include elements for the transmission of packets via antenna 750. Interface 1011 may also include an RF signal router, such as the RF splitter/LNA 740 described above and illustrated in FIG. 7. RF signal router 740 is configured to receive an incoming RF signal and route the RF signal to the plurality of RF receivers of PHY 725. RF signal router 740 is also configured to vary at least one of signal gain and signal loss for the incoming RF signal across each of the plurality of RF receivers such that each of the plurality of RF receivers has a different effective noise figure with respect to each other.

In addition to a traditional processor and memory, processing circuitry 1012 may comprise integrated circuitry for processing and/or control, e.g., one or more processors and/or processor cores and/or FPGAs (Field Programmable Gate Array) and/or ASICs (Application Specific Integrated Circuitry). Processing circuitry 1012 may comprise and/or be connected to and/or be configured for accessing (e.g., writing to and/or reading from) memory 1014, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 1014 may be configured to store code executable by control circuitry and/or other data, e.g., data pertaining to communication, e.g., configuration and/or address data of nodes, etc. Processing circuitry 1012 may be configured to control any of the methods described herein and/or to cause such methods to be performed. Memory 1014 stores instructions that, when executed, configure the processor 1013 to control timing offsets of each of the plurality of RF receivers, as described with reference to FIG. 7, such that each of the plurality of RF receivers has a different timing offset with respect to each other. In another embodiment, timing offset controller 1017 performs the function, either alone or in conjunction with processor 1013 of controlling timing offsets of each of the plurality of RF receivers, such that each of the plurality of RF receivers has a different timing offset with respect to each other.

According to another embodiment of the disclosure, creating different timing offsets for each of the plurality of RF receivers includes powering up each of the plurality of RF receivers sequentially. According to another embodiment, creating different timing offsets for each of the plurality of RF receivers includes setting each of the plurality of RF receivers to sleep mode for a different period of time, and awakening each of the plurality of RF receivers from sleep mode.

According to another embodiment, processor 1013 is further configured to determine a time that has elapsed since each of the plurality of RF receivers was placed in and out of sleep mode, and determine if an effective timing for each of the plurality of RF receivers should be reset based on the time that has elapsed since each of the plurality of RF receivers was placed in and out of sleep mode. According to another embodiment, a decision to set each of the plurality of RF receivers to sleep mode and awaken each of the plurality of RF receivers from sleep mode is determined by a determination of a number of duplicate packets received. According to another embodiment, processor 1013 is further configured to determine if the timing offsets for each of the plurality of RF receivers can be improved by identifying a number of received duplicate packets.

According to another embodiment, processor 1013 is further configured to select one of the plurality of RF receivers, place the selected one of the plurality of RF receivers into sleep mode, and bring the selected one of the plurality of RF receivers out of sleep mode so that an effective receive timing of the selected one of the plurality of RF receivers can be reset. According to another embodiment, creating different timing offsets for each of the plurality of RF receivers includes periodically setting a receive sensitivity for each of the plurality of RF receivers at a level such that no signal is received for a given period of time, and resetting the receive sensitivity for each of the plurality of RF receivers. According to another embodiment, creating different timing offsets for each of the plurality of RF receivers includes setting receive sensitivities for each of the plurality of RF receivers to a different value.

According to another embodiment, creating different timing offsets for each of the plurality of RF receivers includes determining a number of duplicate packets received by each of the plurality of RF receivers, determining relative signal strengths of packets received by each of the plurality of RF receivers, selecting an RF receiver from the plurality of RF receivers, and setting the receiver sensitivity for the selected RF receiver to a particular value, the setting of the receiver sensitivity to a particular value based upon at least one of the determined number of duplicate packets received by each of the plurality of RF receivers and the determined relative signal strengths of packets received by each of the plurality of RF receivers.

According to this embodiment of the disclosure, the interface 1011 is configured to receive input signals and the processor 1013 is configured to measure and monitor input signals' attributes, including the preamble and MAC header according to the IEEE 802.11 standard. Also, the interface 1011 is arranged to receive input signals and the processor 1013 is arranged to measure and monitor input signals' attributes, including management, data and control packets transmitted by an access point or station that is based upon the IEEE 802.11 standard. The memory 1014 may store instructions for executing any method mentioned in the specification, input signals, and results of processing of the processor 10123 signals to be outputted and the like.

In an embodiment of this disclosure, the wireless device 1010 may include additional wireless devices that are used as receivers. Each of these receivers may then be used to detect packets in the case that the reception is such that many packets are being received from other networks and devices. The likelihood that a wanted packet is received and detected from among a multitude of packets is increased by using more receivers.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

While the above description contains many specifics, these should not be construed as limitations on the scope, but rather as an exemplification of several embodiments thereof. Many other variants are possible including, for examples: the disclosure need not be limited to airborne applications, the number receivers used in the multi-PHY architecture, the number of transmitters used in the multi-PHY architecture, the number of antennas employed, the method of resetting a receiver in time, the method of distributing the relative sensitivities of the receivers, the architecture of the common MAC layer, the architecture of the RF Splitter and LNA receive paths, the architecture of the transmit receive switching. Accordingly the scope should be determined not by the embodiments illustrated, but by the claims and their legal equivalents.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope.

What is claimed is:

1. A monitoring station for increasing a frequency of wireless packet reception, the monitoring station comprising:
   a physical layer (PHY) comprising a plurality of radio frequency (RF) receivers;
   processing circuitry comprising:
      a processor; and
      a memory storing instructions that, when executed, configure the processor to:
         control timing offsets of each of the plurality of RF receivers such that each of the plurality of RF receivers has a different timing offset with respect to each other; and
   an interface, the interface including an RF signal router configured to:
      receive an incoming RF signal and route the RF signal to the plurality of RF receivers; and
      vary at least one of signal gain and signal loss for the incoming RF signal across each of the plurality of RF receivers such that each of the plurality of RF receivers has a different effective noise figure with respect to each other.

2. The monitoring station of claim 1, wherein creating different timing offsets for each of the plurality of RF receivers comprises:
   powering up each of the plurality of RF receivers sequentially.

3. The monitoring station of claim 1, wherein creating different timing offsets for each of the plurality of RF receivers comprises:
   setting each of the plurality of RF receivers to sleep mode for a different period of time; and
   awakening each of the plurality of RF receivers from sleep mode.

4. The monitoring station of claim 3, wherein the processor is further configured to:
   determine a time that has elapsed since each of the plurality of RF receivers was placed in and out of sleep mode; and
   determine if an effective timing for each of the plurality of RF receivers should be reset based on the time that has elapsed since each of the plurality of RF receivers was placed in and out of sleep mode.

5. The monitoring station of claim 3, wherein a decision to set each of the plurality of RF receivers to sleep mode and awaken each of the plurality of RF receivers from sleep mode is determined by a determination of a number of duplicate packets received.

6. The monitoring station of claim 1, wherein the processor is further configured to determine if the timing offsets for each of the plurality of RF receivers can be improved by identifying a number of received duplicate wireless packets.

7. The monitoring station of claim 1, wherein the processor is further configured to:
   select one of the plurality of RF receivers;
   place the selected one of the plurality of RF receivers into sleep mode; and
   awaken the selected one of the plurality of RF receivers out of sleep mode so that an effective receive timing of the selected one of the plurality of RF receivers can be reset.

8. The monitoring station of claim 1, wherein creating different timing offsets for each of the plurality of RF receivers comprises:
   periodically setting a receive sensitivity for each of the plurality of RF receivers at a level such that no signal is received for a given period of time; and
   resetting the receive sensitivity for each of the plurality of RF receivers.

9. The monitoring station of claim 1, wherein creating different timing offsets for each of the plurality of RF receivers comprises setting receive sensitivities for each of the plurality of RF receivers to a different value.

10. The monitoring station of claim 1, wherein creating different timing offsets for each of the plurality of RF receivers comprises:
    determining a number of duplicate packets received by each of the plurality of RF receivers;
    determining relative signal strengths of wireless packets received by each of the plurality of RF receivers;
    selecting an RF receiver from the plurality of RF receivers; and
    setting the receiver sensitivity for the selected RF receiver to a particular value, the setting of the receiver sensitivity to a particular value based upon at least one of the determined number of duplicate packets received by each of the plurality of RF receivers and the determined relative signal strengths of wireless packets received by each of the plurality of RF receivers.

11. A method for increasing a frequency of wireless packet reception using a physical layer (PHY) comprising a plurality of radio frequency (RF) receivers, the method comprising:
    controlling timing offsets of each of the plurality of RF receivers such that each of the plurality of RF receivers has a different timing offset with respect to each other;
    receiving an incoming RF signal and routing the RF signal to the plurality of RF receivers; and
    varying at least one of signal gain and signal loss for the incoming RF signal across each of the plurality of RF receivers such that each of the plurality of RF receivers has a different effective noise figure with respect to each other.

12. The method of claim 11, wherein creating different timing offsets for each of the plurality of RF receivers comprises:
    powering up each of the plurality of RF receivers sequentially.

13. The method of claim 11, wherein creating different timing offsets for each of the plurality of RF receivers comprises:
    setting each of the plurality of RF receivers to sleep mode for a different period of time; and
    awakening each of the plurality of RF receivers from sleep mode.

14. The method of claim 13, further comprising:
    determining a time that has elapsed since each of the plurality of RF receivers was placed in and out of sleep mode; and
    determining if an effective timing for each of the plurality of RF receivers should be reset based on the time that has elapsed since each of the plurality of RF receivers was placed in and out of sleep mode.

15. The method of claim 13, wherein a decision to set each of the plurality of RF receivers to sleep mode and awaken each of the plurality of RF receivers from sleep mode is determined by a determination of a number of duplicate packets received.

16. The method of claim 11, further comprising determining if the timing offsets for each of the plurality of RF receivers can be improved by identifying a number of received duplicate wireless packets.

17. The method of claim 11, further comprising:
selecting one of the plurality of RF receivers;
placing the selected one of the plurality of RF receivers into sleep mode; and
bringing the selected one of the plurality of RF receivers out of sleep mode so that an effective receive timing of the selected one of the plurality of RF receivers can be reset.

18. The method of claim 11, wherein creating different timing offsets for each of the plurality of RF receivers comprises:
periodically setting a receive sensitivity for each of the plurality of RF receivers at a level such that no signal is received for a given period of time; and
resetting the receive sensitivity for each of the plurality of RF receivers.

19. The method of claim 11, wherein creating different timing offsets for each of the plurality of RF receivers comprises setting receive sensitivities for each of the plurality of RF receivers to a different value.

20. The method of claim 11, wherein creating different timing offsets for each of the plurality of RF receivers comprises:
determining a number of duplicate packets received by each of the plurality of RF receivers;
determining relative signal strengths of wireless packets received by each of the plurality of RF receivers;
selecting an RF receiver from the plurality of RF receivers; and
setting the receiver sensitivity for the selected RF receiver to a particular value, the setting of the receiver sensitivity to a particular value based upon at least one of the determined number of duplicate packets received by each of the plurality of RF receivers and the determined relative signal strengths of wireless packets received by each of the plurality of RF receivers.

* * * * *